United States Patent
Matsumoto et al.

(10) Patent No.: US 11,008,452 B2
(45) Date of Patent: May 18, 2021

(54) COPOLYMER, PROCESS FOR PRODUCING COPOLYMER, RESIN COMPOSITION, SHAPED ARTICLE AND VEHICLE

(71) Applicant: Mitsubishi Chemical Corporation, Chiyoda-ku (JP)

(72) Inventors: Akikazu Matsumoto, Tokyo (JP); Risa Yamashita, Tokyo (JP); Haruki Okada, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 223 days.

(21) Appl. No.: 15/746,235

(22) PCT Filed: Jul. 6, 2016

(86) PCT No.: PCT/JP2016/069992
§ 371 (c)(1),
(2) Date: Jan. 19, 2018

(87) PCT Pub. No.: WO2017/022393
PCT Pub. Date: Feb. 9, 2017

(65) Prior Publication Data
US 2018/0258272 A1 Sep. 13, 2018

(30) Foreign Application Priority Data

Jul. 31, 2015 (JP) .............................. JP2015-151403

(51) Int. Cl.
*C08L 33/12* (2006.01)
*C08F 220/14* (2006.01)
*C08F 8/48* (2006.01)
*C08F 2/20* (2006.01)
*C08L 33/06* (2006.01)
*C08F 2/38* (2006.01)
*C08F 2/18* (2006.01)
*C08F 220/08* (2006.01)

(52) U.S. Cl.
CPC ............... *C08L 33/12* (2013.01); *C08F 2/18* (2013.01); *C08F 2/20* (2013.01); *C08F 2/38* (2013.01); *C08F 8/48* (2013.01); *C08F 220/14* (2013.01); *C08L 33/064* (2013.01); *C08F 220/08* (2013.01); *C08F 2800/10* (2013.01); *C08F 2810/50* (2013.01)

(58) Field of Classification Search
CPC .......... C08L 33/12; C08F 8/48; C08F 220/14; C08F 2800/10; C08F 2810/50; C08F 2/18
USPC ....................................................... 524/523
See application file for complete search history.

(56) References Cited

U.S. PATENT DOCUMENTS

2011/0166293 A1* 7/2011 Dufaure ................ C08F 265/04
525/69
2012/0029139 A1* 2/2012 Dufaure .............. C08F 293/005
524/533

FOREIGN PATENT DOCUMENTS

| EP | 0 264 508 A1 | 4/1988 |
|---|---|---|
| JP | 58-217501 A | 12/1983 |
| JP | 2006-239739 A | 10/2006 |
| JP | 2006-274118 A | 10/2006 |
| JP | 2009-258406 A | 11/2009 |
| JP | 2009256406 A * | 11/2009 |
| JP | 2011-524454 A | 9/2011 |
| JP | 2011-213781 A | 10/2011 |
| JP | 2014-501293 A | 1/2014 |
| WO | WO 2012/141422 A1 | 10/2012 |

OTHER PUBLICATIONS

Extended European Search Report dated Jul. 25, 2018 in Patent Application No. 16832672.6.
Japanese Office Action dated Sep. 24, 2019 in Patent Application No. 2016-548336 (with English translation), 8 pages.
International Search Report dated Oct. 4, 2016, in PCT/JP2016/069992 filed Jul. 6, 2016.
Brazilian Search Report and Written Opinion dated Mar. 10, 2020 in Patent Application No. BR112018001774-4 (with English translation), 8 pages.
Indian Office Action dated Nov. 25, 2019, in Patent Application No. 201847002692, 5 pages.

* cited by examiner

*Primary Examiner* — Hui H Chin
(74) *Attorney, Agent, or Firm* — Oblon, McClelland, Maier & Neustadt, L.L.P.

(57) ABSTRACT

The present invention provides a copolymer containing 80 mol % or more of a methyl (metl)acrylate unit (A), wherein the Vicat softening temperature thereof is 115° C. or higher, the saturated water absorption rate thereof at 60° C. is 4 % by weight or less, and the yellow index thereof is 1 or less. The process for producing the copolymer includes suspension polymerizing a monomer mixture containing 80 mol % or more of methyl (meth)acrylate (a) and 0.7 mol % to 7 mol % of (meth)acrylic acid (b), followed by melting and kneading the resulting precursor with an extruder to obtain a copolymer containing 80 mol % or more of a methyl (meth)acrylate unit (A), 0.45 mol % to 7 mol % of a (meth)acrylic acid unit (B), and 0.001 mol % to 0.25 mol % of a glutaric anhydride unit (C) wherein a conversion rate to the glutaric anhydride unit (C) is 0.1 % to 5 %.

9 Claims, No Drawings

COPOLYMER, PROCESS FOR PRODUCING COPOLYMER, RESIN COMPOSITION, SHAPED ARTICLE AND VEHICLE

TECHNICAL FIELD

The present invention relates to a copolymer, a process for producing a copolymer, a resin composition, a shaped article and a vehicle.

The present application claims priority on the basis of Japanese Patent Application No. 2015-151403, filed in Japan on Jul. 31, 2015, the contents of which are incorporated herein.

BACKGROUND ART

Polymethyl methacrylates and polycarbonates are widely used in various fields such as optical materials, vehicle parts, lighting materials or construction materials due to their superior transparency and dimensional stability.

Objects shaped from polymethyl methacrylates and polycarbonates have recently been required to demonstrate higher levels of performance accompanying reductions in thickness and size of various parts and components. One area of performance required to be improved is heat resistance. Vehicle parts such as tail lamps and head lamps in particular are required to demonstrate more superior heat instance since automobiles and other vehicles using these parts are used at high temperatures and high humidity.

However, although polymethyl methacrylates have superior transparency and weather resistance, they have insufficient heat resistance. In addition, although polycarbonates have superior heat resistance and impact resistance, they exhibit optical distortion in the form of large birefringence resulting in the occurrence of optical anisotropy in shaped articles thereof, while also being considerably inferior with respect to moldability, scratch resistance and oil resistance.

Consequently, studies have been conducted to improve the heat resistance of acrylic resins as represented by polymethyl methacrylates. For example, Patent Document 1 proposes a copolymer having a methyl acrylate unit, methacrylic acid unit glutaric anhydride unit.

PRIOR ART DOCUMENTS

Patent Documents

Patent Document 1: Japanese Unexamined Patent Application, First Publication No. 2009-256406

DISCLOSURE OF THE INVENTION

Problems to be Solved by the Invention

However, the copolymer proposed in Patent Document 1 is inferior with respect to appearance, low water absorbency and moldability due to an excessive number of glutaric anhydride units.

Therefore, an object of the present invention is to provide a copolymer having superior heat resistance, fluidity, mechanical properties, appearance, low water absorbency and moldability. In addition, an object of the present invention is to provide a process for producing a copolymer that enables the resulting copolymer to demonstrate superior heat resistance, fluidity, mechanical properties, appearance, low water absorbency and moldability.

Means for Solving the Problems (1) A copolymer containing 80 mol % or more of a methyl (meth)acrylate unit (A), wherein the Vicat softening temperature thereof is 115° C. or higher, the saturated water absorption rate thereof at 60° C. is 4% by weight or less, and the yellow index thereof is 1 or less.

(2) The copolymer describe in (1), further containing a glutaric anhydride unit (C).

(3) The copolymer described in (1) or (2), further containing a methacrylic acid unit (B).

(4) The copolymer described in any of (1) to (3), wherein the melt flow rate thereof as load of 13.65 kgf and temperature of 230° C. is 10 g/10 minutes or more.

(5) A copolymer containing 80% mol % or more of a methyl (meth)acrylate unit (A), 0.45 mol % to 7 mol % of a (meth)acrylic acid unit (B), and 0.001 mol % to 0.25 mol % of a glutaric anhydride unit (C).

(6) The copolymer described in (5), containing 90 mol % or more of a methyl (meth)acrylate unit (A), 0.5 mol % to 6 mol % of a (meth)acrylic acid unit (B), and 0.001 mol % of a glutaric anhydride unit (C).

(7) The copolymer described in (5) or (6), wherein the conversion rate to the glutaric anhydride unit (C) as represented by equation (1) is 0.1to 5%.

Conversion rate to glutaric anhydride unit (C) (%)={ [ratio of glutaric anhydride unit (C) in copolymer (mol %)]/([ratio of (meth)acrylic acid unit (B) in copolymer (mol %)]+[ratio of glutaric anhydride unit (C) in copolymer (mol %) ])}× 100     (1).

(8) The copolymer described in any of (5) to (7), wherein the conversion rate to the glutaric anhydride unit (C) as represented by the equation (1) is 0.1% to 3%.

(9) The copolymer described in any of (5) to (8), wherein the saturated water absorption rate at 60° C. is 4% by weight or less.

(10) The copolymer described in any of (5) to (9), wherein the melt flow rate at a load of 13.65 kgf and temperature of 230° C. is 10 g/10 minutes or more.

(11) The copolymer described in any of (5) to (10), wherein the yellow index of a shaped article having a thickness of 2 mm is 1 or less.

(12) A process for producing a copolymer, comprising the obtaining of a precursor by suspension polymerizing a monomer mixture containing 80 mol % or more of methyl (meth)acrylate (a) and 0.7 mol % to 7 mol % of (meth)acrylic acid (b) followed by melting and kneading the resulting precursor with an extruder to obtain a copolymer containing 80 mol % or more of a methyl (meth)acrylate unit (A), 0.45 mol % to 7 mol % of a (meth)acrylic acid unit (B), and 0.001 mol % to 0.25 mol % of a glutaric anhydride unit (C).

(13) The process for producing a copolymer described in (12), wherein the amount of a chain transfer agent used during suspension polymerization is 0.1 parts by weight to 0.5 parts by weight based on 100 parts by weight of the monomer mixture.

(14) A resin composition containing the copolymer described in any of (3) to (11).

(15) A shaped article obtained by shaping the resin composition, described in (14).

(16) A vehicle containing the shaped article described is (15).

Effects of the Invention

The copolymer of the present invention demonstrates superior heat resistance, fluidity, mechanical properties, appearance, low water absorbency and moldability.

In addition, the process for producing a copolymer of the present invention allows the obtaining of a copolymer demonstrating superior heat resistance, fluidity, mechanical properties, appearance, low water absorbency and moldability.

Moreover, the shaped article of the present invention demonstrates superior heat resistance, mechanical properties, appearance, low water absorbency and moldability.

BEST MODE FOR CARRYING OUT THE INVENTION

The copolymer of the present invention preferably contains a methyl (meth)acrylate unit (A), a methacrylic acid unit (B) and a glutaric anhydride unit (C) (which may be simply referred to as "unit (A)", "unit (B)"and "unit (C)").

The content of unit (A) in the copolymer containing unit (A), unit (B) and unit (C) is more preferable 80 mol % to 99 mol % and even more preferably 90 mol % to 98 mol % in 100 mol % of the copolymer. If the content of unit (A) is 80 mol % or more. performance inherent to acrylic resins is not impaired particularly from the viewpoints of appearance, low water absorbency and moldability. In addition, if the content of unit (A) is 99 mol % or less, the copolymer demonstrates superior heat resistance and mechanical properties.

Furthermore, in the present description, the content of each unit in the copolymer is the value calculated from measurement of the $^1$H-NMR spectrum thereof The content of unit (B) in the copolymer containing unit (A), unit (B) and unit (C) is preferably 0.45 mol % to 7 mol % and more preferably 0.5 mol % to 6 mol % in 100 mol % of the copolymer. If the content of unit (B) is 0.45 mol % or more. the copolymer demonstrates superior heat resistance and mechanical properties. In addition, if the content of unit (B) is 7 mol % or less, performance inherent to acrylic resins is not impaired particularly from the viewpoints of appearance, low water absorbency and moldability.

The content of unit (C) in the copolymer containing unit (A), unit (B) and unit (C) is preferably 0.001 mol % to 0.25 mol % and more preferably 0.001 mol % to 0.15 mol % in 100 mol % of the copolymer. If the content of unit (C) is 0.001 mol % or more, the copolymer demonstrates superior heat resistance and mechanical properties. In addition, if the content of unit (C) is 0.25 mol % or less, performance inherent to acrylic resins is not impaired particularly from the viewpoints of appearance, low water absorbency and moldabillty.

The conversion rate (%) to the glutaric anhydride unit (C) can be obtained according to the following equation (1).

Conversion rate to glutaric anhydride unit (C) (%)={[ratio of glutaric anhydride unit (C) in copolymer (mol %)]/([ratio of (meth)acrylic acid unit (B) in copolymer (mol %)]+[ratio of glutaric anhydride unit (C) in copolymer (mol %) ])}× 100  (1).

The conversion rate of the glutaric anhydride unit (C) is preferably 0.1 % to 5% and more preferably 0.1% to 3%. If the conversion rate to the glutaric anhydride unit (C) is 0.1 % or more, the copolymer demonstrates superior heat resistance. In addition, if the conversion rate to the glutaric anhydride unit (C) is 5% or less, performance inherent to acrylic resins is not impaired particularly from the viewpoint of appearance.

In order to obtain a copolymer containing 80 mol % or more of unit (A), 0.45 mol % to 7 mol % of unit (B) and 0.001 mol % to 0.25 mol % of unit (C), a monomer mixture containing 80 mol % or more of methyl (meth)acrylate (a) and 0.7 mol % to 7 mol % of (meth)acrylic acid (b) is polymerized to obtain a precursor followed by heating, melting and kneading the resulting precursor with an extruder and the like to react unit (A) and unit (B) of the precursor and form unit (C).

The heating temperature is preferably 200° C. to 270° C. and more preferably 210° C. to 260° C. If the healing temperature is 200° C. or higher, the copolymer demonstrates superior fluidity and productivity of the copolymer and resin composition is also superior. In addition, if the heating temperature is 270° C. or lower, thermal degradation of the copolymer can be inhibited.

The heating time is preferably 1 second to 2400 seconds, more preferably 5 seconds to 1800 seconds and even more preferably 10 seconds to 1200 seconds. If the heating time is 1 second or more, the copolymer and resin composition can be adequately mixed. In addition, if the heating time is 2400 seconds or less, thermal degradation of the copolymer can be inhibited.

The copolymer of the present invention may also contain another monomer unit (D) ( which may be simply referred to as "unit (D)") in addition to the unit (A), unit (B) and unit (C).

The content of unit (D) is preferably 15 mol % or less and more preferably 5 mol % or less in 100% of the copolymer since the resin composition does not impair the inherent performance of acrylic resin.

Examples of monomers composing unit (D) include (meth)acrylates such as ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-hexyl (meth)acrylate, cyclohexyl (meth)acrylate, n-octyl (meth)acrylate, 2-ethylhexyl (meth)acrylate, dodecyl (meth)acrylate, tridecyl (meth)acrylate, stearyl (meth)acrylate, phenyl (meth)acrylate, benzyl (meth)acrylate, phenoxyethyl (meth)acrylate, isobornyl (meth)acrylate, glycidyl (meth)acylate, tetrahydrofurfuryl (meth)acrylate, norbornyl (meth)acrylate, adamantyl (meth)acrylate. dicyclopentenyl (meth)acrylate, dicyclopentanyl (meth)acrylate, tetracyclododecanyl dicyclopentanyl (meth)acrylate or cyclohexanedimethanol mono(meth)acrylate and aromatic vinyl monomers such as styrene or α-methylstyrene.

Methyl (meth)acrylate refers to both methyl methacrylate and methyl acrylate.

Among the methyl (meth)acrylates (a), that having methyl methacrylate for the main component thereof is preferable due to the superior appearance and mechanical properties of the resulting copolymer. In addition, the use of methyl acrylate together with methyl methacrylate is more preferable from the viewpoint of improving resistance to thermal decomposition of the copolymer.

Similarly, the main component of unit (A) is preferably methyl methacrylate due to the superior appearance and mechanical properties of the resulting copolymer. In addition, a methyl acrylate unit is more preferably contained together with a methyl methacrylate unit from the viewpoint of improving resistance to thermal decomposition of the copolymer.

(Meth)acrylic acid refers to both acrylic acid and methacrylic acid.

Among the (meth)acrylic acids (b), methacrylic acid is preferable due to the superior heat resistance of the resulting copolymer.

Similarly, a methacrylic acid unit is preferable for unit (B) due to the superior heat resistance of the resulting copolymer.

The content of methyl (meth)acrylate (a) in the monomer mixture containing methyl (meth)acrylate (a) and (meth) acrylic acid (b) is preferably 80 mol % or more, more preferably 80 mol % to 99.5 mol % and even more preferably 90 mol % to 99 mol % in 100 mol % of the monomer mixture. If the content of the methyl (meth)acrylate (a) is 80 mol % or more, performance inherent to acrylic resins is not impaired particularly front the viewpoints of appearance, low water absorbency and moldability. in addition, if the content of the methyl (meth)acrylate (a) is 99.5 mol % or less, the copolymer demonstrates superior heat resistance and mechanical properties.

The content of the (meth)acrylic acid (b) in the monomer mixture containing the methyl (meth)acrylate (a) and the (meth)acrylic acid (b) is preferably 0.7 mol % to 7 mol % and more preferably 1 mol % to 6 mol % in 100 mol % of the monomer mixture If the content of (meth)acrylic acid (b) is 0.7 mol % or more, the copolymer demonstrates superior heat resistance and mechanical properties. In addition, if the content of (meth)acrylic acid (b) is 7 mol % or less, performance inherent to acrylic resins is not impaired particularly from the viewpoints of appearance, low water absorbency and moldability.

The monomer mixture may also contain another monomer (d) in addition to the methyl (meth)acrylate (a) and (meth) acrylic acid (b).

The other monomer (d) is only requital to be able to copolymerize with the methyl (meth)acrylate (a) and the (meth)acrylic acid (b).

The content of the other monomer (d) is preferably 15 mol % or less and more preferably 5 mol % or less in 300 mol % of the monomer mixture since the resin composition does not impair the inherent performance of acrylic resins.

Examples of the other monomer (d) include (meth)acrylates such as ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth) acrylate, n-hexyl (meth)acrylate, cyclohexyl (meth)acrylate, n-octyl (meth)acrylate, 2-ethylhexyl (meth)acrylate, dodecyl (meth)acrylate, tridecyl (meth)acrylate, stearyl (meth)acrylate, phenyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, norbornyl (meth)acrylate, adamantyl (meth)acrylate, dicyclopentenyl (meth)acrylate, dicyclopentanyl (meth)acrylate, tetracyclododecanyl (meth)acrylate or cyclohexanedimethanol mono(meth)acrylate, and aromatic vinyl monomers such as styrene or α-methylstyrene.

Examples of methods used to polymerize the monomer mixture include bulk polymerization, solution polymerization, suspension polymerization and emulsion polymerization. Among these methods used to polymerize the monomer mixture, bulk polymerization, solution polymerization and suspension polymerization are preferable due to the superior reaction efficiency of the monomer mixture.

When polymerizing the monomer mixture, parameters such as polymerization temperature the type of polymerization initiator or amount of polymerization initiator are suitably set corresponding to the polymerization, method and the copolymer to be obtained.

The weight average molecular weight of the copolymer is 50,000 to 150,000 and preferably 70,000 to 130,000. If the weight average molecular weight of the copolymer is 50,000 or more, the copolymer demonstrates superior mechanical properties. In addition, if the weight average molecular weight of the copolymer is 150,000 or less, the fluidity of the polymer is superior.

Furthermore, in the present description, weight average molecular weight is the value obtained by measuring weight average molecular weight by gel permeation chromatography using standard polystyrene for the standard sample.

The amount of a chain transfer agent is preferably adjusted during polymerization of the monomer mixture in order to control the weight average molecular weight of the copolymer.

The content of the chain transfer agent during polymerization of the monomer mixture is preferably 0.1 parts by weight to 0.5 parts by weight and more preferably 0.15 parts by weight to 0.4 parts by weight based on 100 parts by weight of the monomer mixture since this allows the copolymer to have a desired weight average molecular weight.

The Vicat softening temperature of the copolymer is preferably 115° C. or higher and more preferably 115° C. to 125° C. If the Vicat softening temperature of the copolymer is 115° C. or higher, the copolymer demonstrates superior heat resistance. In addition, if the Vicat softening temperature of the copolymer is 125° C. or lower, the copolymer demonstrates superior fluidity.

Furthermore, in the present description. Vicat softening temperature is the value obtained by measuring in compliance with method A50 of ISO306.

The melt flow rate of the copolymer is preferably 10 g/10 minutes or more and more preferably 10 g/10 minutes to 15 g/10 minutes. If the melt flow rate of the copolymer is 10 g/10 minutes or more, the copolymer demonstrates superior fluidity. In addition, if the melt flow rate of the copolymer is 15 g/10 minutes or less, the copolymer demonstrates superior mechanical properties.

Furthermore, in the present description, melt flow rate is the value obtained by measuring under conditions of a load of 13.65 kgf and temperature of 230° C., The yellow index of the copolymer is preferably I or less, more preferably 0.7 or less and even more preferably 0.5 or less. If the yellow index of the copolymer is 1 or less, the copolymer demonstrates superior appearance.

Furthermore, in the present description, yellow index is the value obtained by shaping the copolymer into a shaped article having a thickness of 2 mm followed by measuring in compliance with ISO17223.

The saturated water absorption rate of the copolymer is preferably 4% by weight or less, more preferably 3.5% by weight or less and even more preferably 3% by weight or less. If the saturated water absorption rate of the copolymer is 4% by weight or less, the copolymer demonstrates superior low water absorbency and superior dimensional stability of a shaped article.

Furthermore, in the present description, saturated water absorption rate is the value obtained by dividing the difference between the weight of a shaped article that has absorbed water to saturation and the weight of the shaped article when dry by the weight of the shaped article when dry.

The resin composition of the present invention contains the copolymer of the present invention.

The resin composition of the present invention may contain other additives in addition to the copolymer of the present invention.

Examples of other additives include ultraviolet absorbers, antioxidants, plasticizers, optical diffusers, matting agents, lubricants, mold release agents, antistatic agents and colorants such as pigments. One type of these other additives may be used alone or two or more types may be used in combination.

An ultraviolet absorber is preferably contained in the resin composition to inhibit deterioration of the copolymer by sunlight and other ultraviolet light.

An antioxidant is preferably contained in the resin composition to inhibit thermal degradation of the copolymer during melting and kneading or melting and shaping.

As a method of mixing the copolymer with other additives, for example, the method of melting and kneading the copolymer and additives using a device such as a twin-screw extruder can be mentioned. In addition, a precursor and other additives may be heated, melted and kneaded to obtain a copolymer by forming the unit (C) together with mixing a precursor with the other additives.

The shaped article of the present invention is obtained by shaping the resin composition of the present invention.

Examples of shaping methods for obtaining the shaped article include injection molding, extrusion molding and pressure molding. In addition, the resulting shaped article may be further subjected to secondary shaping such as compression shaping or vacuum shaping.

The shaping temperature is preferably 200° C. to 270° C. and more preferably 210° C. to 260° C. If the shaping temperature is 200° C. or higher the resin composition demonstrates superior fluidity and the shaped article demonstrates a superior appearance. In addition, if the shaping temperature is 270° C. or lower, thermal degradation of the copolymer can be inhibited.

The shaping time is preferably 30 seconds to 1200 seconds, more preferably 45 seconds to 900 seconds and even more preferably 60 seconds to 600 seconds. If the shaping time is 30 seconds or more, the resin composition demonstrates superior fluidity and the shaped article demonstrates a superior appearance. In addition, if the shaping time is 1200 seconds or less, thermal degradation of the copolymer can be inhibited.

The shaped article of the present invention can be used in applications such as optical materials, vehicle parts, lighting materials or construction materials due to the superior heat resistance, mechanical properties and appearance thereof, and is used particularly preferably in automobile and other vehicle parts.

Examples of ant onto bile and other vehicle parts include rear lamp outer covers, optical members within the rear lamps, headlight inner lenses (which may be collectively referred to as projector lenses or PES lenses), meter covers, door mirror housings, pillar covers (sash covers), license plate garnish, front grilles, fog light garnish and emblems.

EXAMPLES

Although the following provides a detailed explanation of the present invention through examples thereof, the present invention is not limited to these examples.

(Content of each Unit in Copolymer)

Copolymers obtained in the examples and comparative examples and deuterated dimethylsulfoxide were supplied to a 20 ml Schlenk tube equipped with a stirrer followed by heating to 80° C. while stirring to melt the copolymer. Subsequently, the molten copolymer was cooled to 23° C. followed by supplying benzylamine to the Schlenk tube and heating to 80° C. while stirring. After allowing to react for 1 hour, the reaction solution was extracted and subjected to $^1$H-NMR measurement using a nuclear magnetic resonance apparatus (Varian, Inc., 270 MHz) under conditions of a measuring temperature of 80° C. and a cumulative number of 32 times.

Based on the results of the resulting $^1$H-NMR measurement, the content of unit (C) in the copolymer was calculated from the ratio of the integrated value of the benzylic proton of unreacted benzylamine assigned to a single peak present in the vicinity of 3.7 ppm and the integrated value of the benzylic proton of glutaric acid benzylamide assigned to a single peak present in the vicinity of 4.2 ppm. In addition, the contents of unit (A) and unit (B) in the copolymer were calculated by respectively determining the ratio of the integrated value of the proton derived front unit (A) assigned to a single peak present in the vicinity of ppm, and the integrated value of protons derived from unit (A) and unit (B) present in the vicinity of 0.5 ppm to 2.5 ppm, to the integrated value of the benzylic proton of unreacted benzylamine assigned to a single peak present in the vicinity of 3.7 ppm.

(Weight Average Molecular Weight)

10 mg of the copolymers obtained in the examples and comparative examples were dissolved in 10 ml of tetrahydrofuran followed by filtering with a 0.5 μm membrane filter to obtain sample solutions. The resulting sample solutions were measured for weight average molecular weight by gel permeation chromatography (Model HLC-8320 GPC Eco SEC, Tosoh Corp.). Two TSKgel Super HZM-H columns (trade name, Tosoh Corp., inner diameter: 4.6 mm×length: 15 mm) were connected in series for use as the separation column, tetrahydrofuran was used for the solvent, a differential refractometer was used for the detector, standard polystyrene was used for the standard sample, and chromatography was carried out under conditions of a flow rate of 0.6 ml/min, a measuring temperature of 40° C. and an injection volume of 0.1 ml.

(Evaluation of Heat Resistance)

The copolymers obtained in the examples and comparative examples were injection molded using an injection molding machine (Model IS-100, Toshiba Machine Co., Ltd.) under conditions of a shaping temperature of 250° C. and a shaping time of 360 seconds to obtain shaped articles measuring 80 mm×8 m×4 mm. The resulting 80 mm×8 mm×4 mm shaped articles were cut in half to obtain shaped articles measuring 40 mm×8 mm×4 mm followed by annealing for 16 hours at 80° C. and using the resulting shaped articles as test pieces for evaluating heat resistance.

Heal resistance was evaluated using an HDT/VICAT tester (Model No. 148-HAD Heat Distortion Tester, Yasuda Seiki Seisakusho Ltd.) by carrying out a Vicat softening temperature test in compliance with method A50 of ISO306 to measure Vicat softening temperature.

Furthermore, Vicat softening temperature was measured three times for each copolymer, and the average thereof was taken to be the Vicat softening temperature of that copolymer.

(Evaluation of Fluidity)

The copolymers obtained in the examples and comparative examples were measured for melt flow rate by supplying to a melt indexer (Model L244 Melt Indexer, Technol Seven Co., Ltd.). Testing was carried out under conditions of a temperature of 230° C. and a load of 13.65 kg, and the test cutoff interval was taken to be 10 seconds to 120 seconds corresponding to the fluidity of the copolymer.

Furthermore, testing was carried out five times on each copolymer, and the average thereof was taken to be the melt flow rate of that copolymer.

(Evaluation of Mechanical Properties)

Copolymers obtained in the examples and comparative examples were injection molded using an injection molding machine (Model IS-100, Toshiba Machine Co., Ltd.) under conditions of a shaping temperature of 250° C. and a shaping time of 360 seconds to obtain shaped articles measuring 80 mm×8 mm×4 mm. The resulting 80 mm×8 mm×4mm shaped articles were used as test pieces for evaluating mechanical properties.

Mechanical properties were evaluated by measuring bending elastic modulus by carrying out a three-point bending test in compliance with ISO178 using a Tensilon universal testing machine Model RTC-1250A-PL, Orientec Corp.).

Furthermore, three-point bending tests were carried out five times on each copolymer, and the average thereof was taken to be the bending elastic modulus of that copolymer.

(Evaluation of Appearance)

Transparency

The copolymers obtained in the examples and comparative examples were injection molded using an injection molding machine (Model IS-100, Toshiba Machine Co., Ltd.) under conditions of a shaping temperature of 250° C. and a shaping time of 360 seconds to obtain shaped articles measuring 100 mm×50 mm×2 mm. The resulting 100 mm×50 mm×2 mm shaped articles were used as test pieces for evaluating transparency.

Transparency was evaluated by measuring total light transmittance of shaped articles having a thickness of 2 mm in compliance with ISO3468 and measuring the haze value of shaped articles having a thickness of 2 mm in compliance with ISO14782using a haze-meter(Model NDH-2000, Nippon Denshoku Industries Co., Ltd.).

Furthermore, testing was carried out three times on each copolymer, and the average values thereof were used as the values of total light transmittance and haze.

Color Tone

The copolymers obtained in the examples and comparative examples were Injection molded using an injection molding machine (Model IS-100, Toshiba Machine Co., Ltd.) under conditions of a shaping temperature of 250° C. and a shaping time of 360 seconds to obtain shaped articles measuring 100 mm×50 mm×2 mm. The resulting 100 mm×50 mm×2 mm shaped articles were used as test pieces for evaluating color tone.

Color tone was evaluated by measuring the yellow index (YI) of shaped articles having a thickness of 2 mm in compliance with ISO17223 using an instantaneous multi-photometric system (Model MCPD-3000, Otsuka Electronics Co., Ltd.).

Furthermore, testing was carried out three times on each copolymer, and the average value thereof was taken to be the yellow index (YI) of that copolymer.

(Evaluation of Water Absorbency)

The copolymers obtained in the examples and comparative examples were injection molded using an injection molding machine (Model IS-100, Toshiba Machine Co., Ltd.) under conditions of a shaping temperature of 250° C. and a shaping tune of 360 seconds to obtain shaped articles measuring 80 mm×8 mm×4 mm. The resulting 80 mm×8 mm×4 mm shaped articles were used as test pieces for evaluating water absorbency.

The resulting test pieces were dried in a vacuum dryer for 16 hours at 80° C. followed by accurately determining the weights thereof when dry. Subsequently, the test pieces were allowed to stand undisturbed in a compact environmental test chamber (Model SH-241, Espec Corp.) set to 60° C. and 90% relative humidity. Weight was repeatedly measured until increases in weight attributable to moisture absorption were no longer observed. The point at which increases in weight were no longer observed was judged to be the point of saturated water absorption, and the weight at the point of saturated water absorption was accurately determined. Saturated water absorption rate was the calculated according to the following equation (2).

Saturated water absorption rate (%)={([weight at time of saturated water absorption]−[dry weight])/[dry weight]}×100 (2)

Furthermore, testing was carried out three times on each copolymer, and the average value thereof was taken to be the saturated water absorption rate of that copolymer.

(Evaluation of Moldability)

The copolymers obtained in the examples and comparative examples were injection molded using an injection molding machine (Model IS-100, Toshiba Machine Co., Ltd.) under conditions of a shaping temperature of 250° C. and a shaping time of 360 seconds to obtain, shaped articles measuring 1.00 mm×50 mm×2 mm.

Ten of the resulting shaped articles were examined visually and those shaped articles for which silver streak defects were not confirmed in any of the shaped articles were evaluated as "A", while those in which even one silver streak defect was confirmed were evaluated as "B".

Production Example 0

300 parts by weight of deionized water, 60 parts by weight of sodium 2-sulfoethyl methacrylate, 10 parts by weight of potassium methacrylate and 12 parts by weight of methyl methacrylate were supplied to a flask equipped with a stirrer, thermometer and cooling tube followed by healing so that the temperature inside the flask reached 50° C. while releasing nitrogen into the flask. Subsequently, 0.08 parts by weight of 2,2'-azobis(2-methylpropionamidine) dihydrochloride were supplied to the flask followed by heating so that the temperature in the flask reached 60° C. Subsequently, methyl methacrylate was dropped in for 75 minutes at the rate of 0.24 parts by weight/minute using a dropping pump. The mixture was then held for 6 hours to obtain a dispersant (solid content: 10% by weight).

Production Example 1

2000 parts by weight of deionized water and 4.2 parts by weight of sodium sulfate were supplied to a separable flask equipped with a stirrer, thermometer, cooling tube and nitrogen gas feed tube followed by stirring for 15 minutes at a stirring speed of 320 rpm. Subsequently 1339.4 parts by weight of methyl methacrylate (95 mol %, trade name. "Acryester M", Mitsubishi Rayon Co., Ltd.), 60.6 parts by weight of methacrylic acid (5 mol %), 2.8 parts by weight of 2,2'-azobis-2-methylbutyronitrile (polymerization initiator, trade name: "V-59", Wako Pure Chemical Industries. Ltd.) and 4.2 parts by weight of n-octylmercaptan (chain transfer agent, Tokyo Chemical Industry Co., Ltd.) (0.3 parts by weight as the content based on a total of 100 parts by weight of monomer) were supplied to the separable flask and stirred for 5 minutes. Subsequently. 6.72 parts by weight of the dispersant produced in Production Example 0 were supplied to the separable flask and stirred followed by dispersing the monomer mixture in the separable flask in water. Nitrogen gas was then released into the flask for 15 minutes.

Subsequently, the monomer mixture was heated so that the temperature inside the separable flask reached 75° C. and the mixture was held at that temperature until an exothermic peak attributable to polymerization was observed. After the exothermic peak attributable to polymerization was observed, the monomer mixture was heated so that the temperature inside the separable flask reached 90° C. followed by holding at that temperature for 60 minutes to complete polymerization. Subsequently, the mixture inside the separable flask was filtered and the filtrate was rinsed with deionized water followed by drying for 16 hours at 80° C. to obtain a bead-like precursor (1).

Production Examples 2 to 10

Bead-like precursors (2) to (10) were obtained by carrying out the same procedure as Production Example 1 with the exception of changing the contents of methyl (meth)acrylate (a) and (meth)acrylic acid (b) in the monomer mixture, as well as the content of the chain transfer agent, as shown in Table 1.

Example 1

The resulting bead-like precursor (1) was melted and kneaded at a kneading temperature of 250° C. and kneading time of 60 seconds using a twin-screw extruder (Werner & Pfleider Corp., 30 mmφ) to form the glutaric anhydride unit (C) and obtain a pellet-like copolymer.

The results of evaluating the resulting copolymer are shown in Table 2.

Examples 2 to 7 and Comparative Examples 1 and 2

Pellet-like copolymers were obtained by carrying out the same procedure as Example 1 with the exception of using precursors (2) to (9) for the precursor used in Example 1.

The results of evaluating the resulting copolymers are shown in Table 2.

Example 8

The resulting bead-like precursor (2) was heated for 10 minutes in an inert atmosphere oven. (Model DN-6111, Yamato Scientific Co., Ltd.) heated to 235° C. to form the glutaric anhydride unit (C) and obtain a copolymer.

The results of evaluating the resulting copolymer are shown in Table 3.

Comparative Examples 3 and 4

Copolymers were obtained by carrying out the same procedure as Example 8 with the exception of using the type of precursor used and heating time in the inert atmosphere oven shown in Table 3.

The results of evaluating the resulting copolymers are shown in Table 3.

TABLE 1

|  | Precursor | Methyl (meth)acrylate (a) | | (Meth)acrylic acid (b) | Chain transfer agent (pbw) |
| --- | --- | --- | --- | --- | --- |
|  |  | Methyl methacrylate (mol %) | Methyl acrylate (mol %) | Methacrylic acid (mol %) |  |
| Production Example 1 | (1) | 95 | 0 | 5 | 0.3 |
| Production Example 2 | (2) | 94 | 1 | 5 | 0.3 |
| Production Example 3 | (3) | 96 | 1 | 3 | 0.3 |
| Production Example 4 | (4) | 94 | 3 | 3 | 0.2 |
| Production Example 5 | (5) | 94 | 3 | 3 | 0.3 |
| Production Example 6 | (6) | 92 | 3 | 5 | 0.2 |
| Production Example 7 | (7) | 92 | 3 | 5 | 0.3 |
| Production Example 8 | (8) | 89 | 3 | 8 | 0.3 |
| Production Example 9 | (9) | 97 | 3 | 0 | 0.3 |
| Production Example 10 | (10) | 98 | 1 | 1 | 0.3 |

TABLE 2

|  | Precursor | Methyl (meth)acrylate unit (A) (mol %) | Methacrylic acid unit (B) (mol %) | Glutaric anhydride unit (C) (mol %) | Conversion rate to glutaric anhydride unit (C) (%) | Weight average molecular weight | Heat resistance (° C.) |
| --- | --- | --- | --- | --- | --- | --- | --- |
| Ex. 1 | (1) | 94.98 | 4.97 | 0.05 | 1.00 | 84000 | 118.9 |
| Ex. 2 | (2) | 94.99 | 4.97 | 0.04 | 0.80 | 80000 | 119.2 |
| Ex. 3 | (3) | 97.00 | 2.99 | 0.01 | 0.33 | 87000 | 122.3 |
| Ex. 4 | (4) | 96.99 | 2.99 | 0.02 | 0.66 | 120000 | 119.3 |
| Ex. 5 | (5) | 97.00 | 2.99 | 0.01 | 0.33 | 86000 | 117.6 |
| Ex. 6 | (6) | 94.95 | 4.90 | 0.15 | 2.97 | 140000 | 122.7 |
| Ex. 7 | (7) | 94.97 | 4.93 | 0.10 | 1.99 | 85000 | 118.8 |
| Comp. Ex. 1 | (8) | 91.90 | 7.88 | 0.22 | 2.47 | 88000 | 121.8 |
| Comp Ex. 2 | (9) | 100.00 | 0.00 | 0.00 | 0.00 | 106000 | 113.4 |

TABLE 2-continued

|  | Fluidity (g/10 min) | Mechanical properties (GPa) | Total light transmittance (%) | Haze | Yellow index | Saturated water absorption rate (%) | Moldability |
| --- | --- | --- | --- | --- | --- | --- | --- |
| Ex. 1 | 14.2 | 3.25 | 92.4 | 0.2 | 0.2 | 3.4 | A |
| Ex. 2 | 14.1 | 3.52 | 92.3 | 0.3 | 0.5 | 3.4 | A |
| Ex. 3 | 13.6 | 3.40 | 92.3 | 0.3 | 0.1 | 2.9 | A |
| Ex. 4 | 4.3 | 3.18 | 92.1 | 0.4 | 0.7 | 3.0 | A |
| Ex. 5 | 13.1 | 3.21 | 92.1 | 0.4 | 0.7 | 3.0 | A |
| Ex. 6 | 3.4 | 3.31 | 92.0 | 0.6 | 0.8 | 3.5 | A |
| Ex. 7 | 12.8 | 3.11 | 92.0 | 0.5 | 0.9 | 3.5 | A |
| Comp. Ex. 1 | 8.6 | 3.17 | 91.8 | 0.7 | 1.3 | 4.2 | B |
| Comp Ex. 2 | 12.2 | 2.95 | 92.7 | 0.3 | 0.4 | 2.2 | A |

TABLE 3

|  | Precursor | Heating temp. (° C.) | Heating time (sec) | Methyl (meth)acrylate unit (A) (mol %) | Methacrylic acid unit (B) (mol %) | Gluaric anhydride unit (C) (mol %) | Conversion rate to glutaric anhydride unit (C) (%) | Heat resistance (° C.) | Yellow index | Saturated water absorption rate (%) |
| --- | --- | --- | --- | --- | --- | --- | --- | --- | --- | --- |
| Example 8 | (2) | 235 | 600 | 94.97 | 4.96 | 0.07 | 1.39 | 119.4 | 0.5 | 3.4 |
| Comp. Ex. 3 | (2) | 235 | 2700 | 94.88 | 4.75 | 0.37 | 7.23 | 119.6 | 1.1 | 3.2 |
| Comp. Ex. 4 | (10) | 235 | 43200 | 98.98 | 0.71 | 0.31 | 30.39 | 115.1 | 1.9 | 2.8 |

The copolymers obtained in Examples 1 to 7 demonstrated superior heat resistance, fluidity, mechanical properties, appearance, low water absorbency and moldability.

On the other hand, the copolymer obtained in Comparative Example 1 was inferior in terms of appearance, low water absorbency and moldability. In addition, the copolymer obtained in Comparative Example 2 was inferior in terms of heat resistance and mechanical properties.

The copolymer obtained in Example 8 demonstrated superior heat resistance, appearance and low water absorbency.

On the other hand, the copolymer obtained in Comparative Example 3 was inferior in terms of appearance. In addition, the copolymer obtained in Comparative Example 4 was also inferior in terms of appearance.

INDUSTRIAL APPLICABILITY

The shaped article of the present invention can be used in applications such as optical materials, vehicle parts, lighting materials or construction materials due to the superior heat resistance, fluidity, mechanical properties, appearance, low water absorbency and moldability thereof, and is used particularly preferably in automobile and other vehicle parts.

The invention claimed is:

1. A copolymer comprising:
   80 mol % or more of a methyl (meth)acrylate unit (A),
   0.45 mol % to 7 mol % of a (meth)acrylic acid unit (B), and
   0.001 mol % to 0.15 mol % of a glutaric anhydride unit (C),
   wherein a conversion rate to the glutaric anhydride unit (C) as represented by equation (1) is 0.1% to 5%:

Conversion rate to glutaric anhydride unit (C) (%)={ [ratio of glutaric anhydride unit (C) in copolymer (mol %)]/([ratio of (meth)acrylic acid unit (B) in copolymer (mol %)]+[ratio of glutaric anhydride unit (C) in copolymer (mol %) ])}× 100          (1).

2. The copolymer according to claim 1, comprising 90 mol % or more of the methyl (meth)acrylate unit (A), 0.5 mol % to 6 mol % of the (meth) acrylic acid unit (B), and 0.001 mol % to 0.15 mol % of the glutaric anhydride unit (C).

3. The copolymer according to claim 1, wherein the conversion rate to the glutaric anhydride unit (C) as represented by the equation (1) is 0.1% to 3%.

4. The copolymer according to claim 1, wherein a saturated water absorption rate at 60° C. is 4% by weight or less.

5. The copolymer according to claim 1, wherein a melt flow rate at a load of 13.65 kgf and temperature of 230° C. is 10 g/10 minutes or more.

6. The copolymer according to claim 1, wherein a yellow index is 1 or less.

7. A resin composition comprising the copolymer according to claim 1.

8. A shaped article obtained by shaping the resin composition according to claim 7.

9. A vehicle comprising the shaped article according to claim 8.

* * * * *